United States Patent
Atchison et al.

(10) Patent No.: US 11,209,181 B2
(45) Date of Patent: Dec. 28, 2021

(54) HEATING, VENTILATING, AND AIR CONDITIONING SYSTEM OVERRIDE SYSTEMS AND METHODS

(71) Applicant: Johnson Controls Technology Company, Plymouth, MI (US)

(72) Inventors: Shaun B. Atchison, Wichita, KS (US); Theresa Thy N. Gillette, Wichita, KS (US); John W. Uerkvitz, Valley Center, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 256 days.

(21) Appl. No.: 15/636,348

(22) Filed: Jun. 28, 2017

(65) Prior Publication Data
US 2018/0031264 A1    Feb. 1, 2018

Related U.S. Application Data

(60) Provisional application No. 62/367,621, filed on Jul. 27, 2016.

(51) Int. Cl.
*F24F 11/30*       (2018.01)
*G05B 19/048*      (2006.01)
(Continued)

(52) U.S. Cl.
CPC .............. *F24F 11/30* (2018.01); *F24F 11/62* (2018.01); *F24F 11/65* (2018.01); *G05B 19/048* (2013.01); *F24F 11/52* (2018.01); *F24F 11/56* (2018.01); *F24F 11/64* (2018.01); *F24F 2110/10* (2018.01); *F24F 2110/20* (2018.01); *F24F 2120/10* (2018.01); *F24F 2120/12* (2018.01);
(Continued)

(58) Field of Classification Search
CPC .. F24F 11/30; F24F 11/65; F24F 11/62; F24F 2110/20; F24F 2120/12; F24F 2120/10; F24F 11/52; F24F 2110/10; F24F 2120/20; F24F 11/56; F24F 11/64; G05B 19/048; G05B 15/02; G05B 2219/2614
USPC ......................................................... 700/278
See application file for complete search history.

(56) References Cited

U.S. PATENT DOCUMENTS 8,660,708 B2    2/2014 Narayanamurthy et al.
2005/0120012 A1*  6/2005 Poth ...................... G05B 15/02
(Continued)

FOREIGN PATENT DOCUMENTS

WO    2017044903    3/2017

*Primary Examiner* — Jigneshkumar C Patel
(74) *Attorney, Agent, or Firm* — Fletcher Yoder, P.C.

(57) ABSTRACT

A heating, ventilating, and air conditioning (HVAC) includes a processor and a plurality of sensors. The plurality of sensors can collect a first set of data indicative of environmental conditions of a structure in which the HVAC control device is located. The HVAC control device can control operational settings of an HVAC system that can supply conditioned air to the structure and operate the HVAC system in a default mode. The HVAC control device can also receive a second set of data collected by one or more sensors of a secondary input device and receive a signal from the secondary input device. Additionally, the HVAC control device can implement an override mode of the control device based on the signal. Implementation of the override mode effectuates a change in the operational settings of the HVAC system.

25 Claims, 9 Drawing Sheets

(51) Int. Cl.
*F24F 11/62* (2018.01)
*F24F 11/65* (2018.01)
*F24F 11/56* (2018.01)
*F24F 11/52* (2018.01)
*F24F 11/64* (2018.01)
*F24F 120/12* (2018.01)
*F24F 110/20* (2018.01)
*F24F 120/10* (2018.01)
*F24F 120/20* (2018.01)
*F24F 110/10* (2018.01)
*G05B 15/02* (2006.01)

(52) U.S. Cl.
CPC .......... *F24F 2120/20* (2018.01); *G05B 15/02* (2013.01); *G05B 2219/2614* (2013.01)

(56) References Cited

U.S. PATENT DOCUMENTS

| | | | | |
|---|---|---|---|---|
| 2007/0299560 A1* | 12/2007 | LaHue | ............... | B60H 1/00378 700/276 |
| 2010/0289643 A1* | 11/2010 | Trundle | ................. | G08C 19/16 340/545.1 |
| 2011/0132991 A1* | 6/2011 | Moody | ............... | G05D 23/1902 236/46 R |
| 2012/0131504 A1* | 5/2012 | Fadell | ................. | F24D 19/1084 715/810 |
| 2013/0332306 A1 | 12/2013 | Fahmy et al. | | |
| 2014/0207292 A1* | 7/2014 | Ramagem | .......... | G05D 23/1902 700/278 |
| 2014/0217185 A1* | 8/2014 | Bicknell | ................. | F24F 11/30 236/1 C |
| 2014/0371635 A1* | 12/2014 | Shinar | .................. | A61B 5/6892 600/595 |
| 2015/0100166 A1* | 4/2015 | Baynes | .................. | G05B 15/02 700/278 |
| 2015/0159899 A1 | 6/2015 | Bergman et al. | | |
| 2015/0159903 A1* | 6/2015 | Marak | .................... | G05B 15/02 700/278 |
| 2015/0168002 A1* | 6/2015 | Plitkins | .................... | F24F 11/70 165/237 |
| 2015/0309483 A1* | 10/2015 | Lyman | .................... | G05B 15/02 700/275 |
| 2015/0369508 A1 | 12/2015 | Rosen | | |
| 2016/0018832 A1 | 1/2016 | Frank et al. | | |
| 2016/0054023 A1* | 2/2016 | Baker | ..................... | E04F 19/00 307/31 |
| 2017/0285596 A1* | 10/2017 | Hunt | ..................... | G05B 19/042 |

* cited by examiner

HEATING, VENTILATING, AND AIR CONDITIONING SYSTEM OVERRIDE SYSTEMS AND METHODS

CROSS REFERENCE TO RELATED APPLICATION

This application claims priority from and the benefit of U.S. Provisional Application Ser. No. 62/367,621, entitled "VARIOUS APP BASED MODE OVERRIDES," filed Jul. 27, 2016, which is hereby incorporated by reference.

BACKGROUND

The present disclosure relates generally to heating, ventilating, and air conditioning systems. A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Many HVAC systems include one or more control devices, such as thermostats, that can be used to regulate characteristics of conditioned air that is supplied by an HVAC unit associated with the control devices. For example, the control devices may be used to regulate the temperature and/or humidity of conditioned air provided by the HVAC unit. Generally speaking, control devices may be programmed to operate at default settings and/or routine settings. For instance, the default settings may include default temperature settings.

SUMMARY

The present disclosure relates to a heating, ventilating, and air conditioning (HVAC) control device that includes a processor, memory, communication circuitry, and a plurality of sensors. The plurality of sensors is configured to collect a first set of data indicative of environmental conditions of a structure in which the HVAC control device is located. The HVAC control device is configured to control operational settings of an HVAC system that is configured to supply conditioned air to the structure and operate the HVAC system in a default mode. The default mode comprises default air temperature set points. The HVAC control device is also configured to receive, via the communication circuitry, a second set of data collected by one or more sensors of a secondary input device and a signal from the secondary input device. The signal corresponds to user input received via the secondary input device. The HVAC control device is further configured to implement an override mode of the control device based on the signal, wherein the override mode comprises an override temperature set point that differs from the default temperature set points, wherein implementation of the override mode effectuates a change in the operational settings of the HVAC system.

The present disclosure also relates to a heating, ventilating, and air conditioning (HVAC) system that includes an HVAC unit configured to supply conditioned to a structure and an HVAC control device. The HVAC control device includes a processor, memory, communication circuitry, and a first plurality of sensors. The first plurality of sensors is configured to collect a first set of data indicative of a condition of the structure. The HVAC control device is configured to control operational settings of the HVAC system and maintain operation of the HVAC system in a default mode. The default mode includes default air temperature set points. The HVAC control device is also configured to receive a second set of data collected by a first sensor of a secondary input device and a signal from the secondary input device via the communication circuitry. Moreover, the HVAC control device is configured to implement an override mode based on the signal. The override mode includes at least one override temperature set point that differs from the default temperature set points. Also, implementation of the override mode effectuates a change in the operational settings of the HVAC system.

The present disclosure further relates to a non-transitory, computer-readable medium comprising instructions configured to cause a processor to control operational settings of an HVAC system that is configured to supply conditioned air to a structure. The instructions are also configured to cause the processor to maintain operation of the HVAC system in a default mode, and the default mode includes default air temperature set points. The instructions are further configured to cause the processor to receive, via a first sensor, a first set of data related to environmental conditions of the structure. Also, the instructions are configured to cause the processor to receive, via communication circuitry, a second set of data collected by a second sensor of a secondary input device as well as a signal from the secondary input device. The instructions are additionally configured to cause the processor to implement an override mode based on the signal. The override mode includes an override temperature set point that differs from the default temperature set points.

DRAWINGS

DETAILED DESCRIPTION

The present disclosure is directed to heating, ventilating, and air conditioning (HVAC) systems and components thereof. More specifically, the present disclosure relates to override modes that may be utilized on control devices, such as thermostats, of HVAC systems. In accordance with present embodiments, a secondary input device, such as a smartphone or another device, can be used to implement several types of override modes of a default routine carried out by a control device of an HVAC system. Additionally, while some of the override modes discussed herein may be implemented and/or created based on user input, other override modes may be executed without user input based on data collected by a secondary input device.

Figure 1:
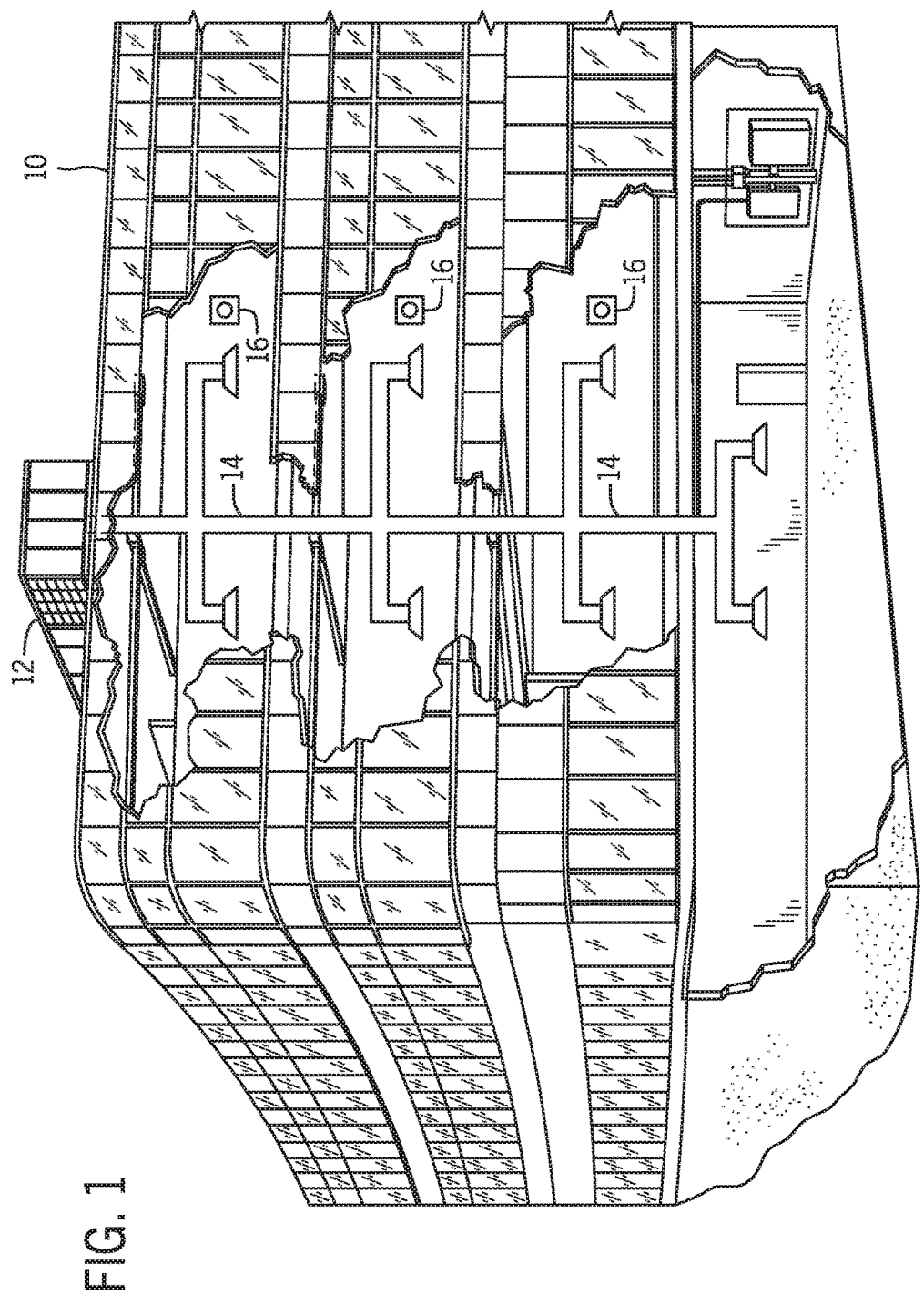
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
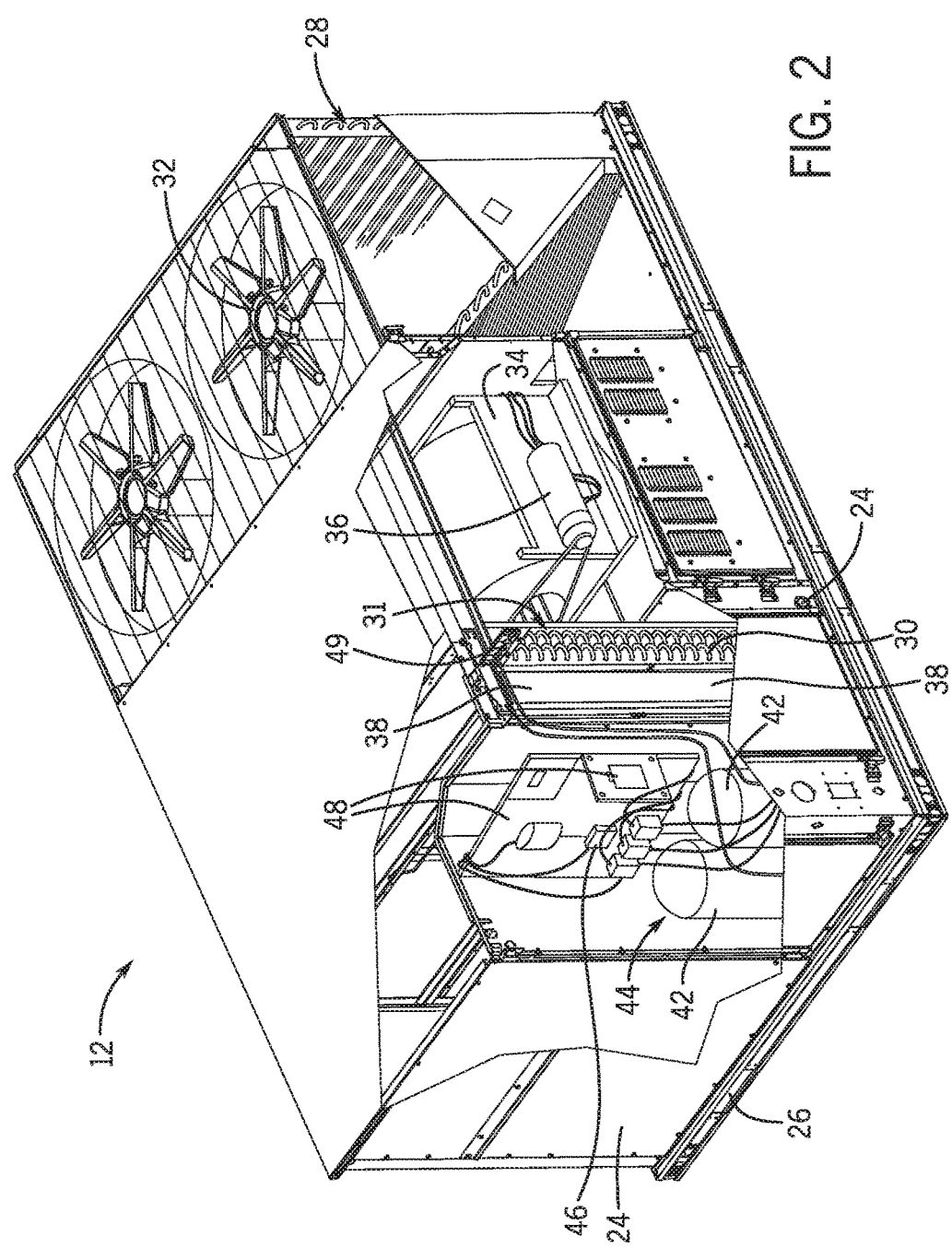
FIG. 2 is a perspective view of the HVAC unit of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
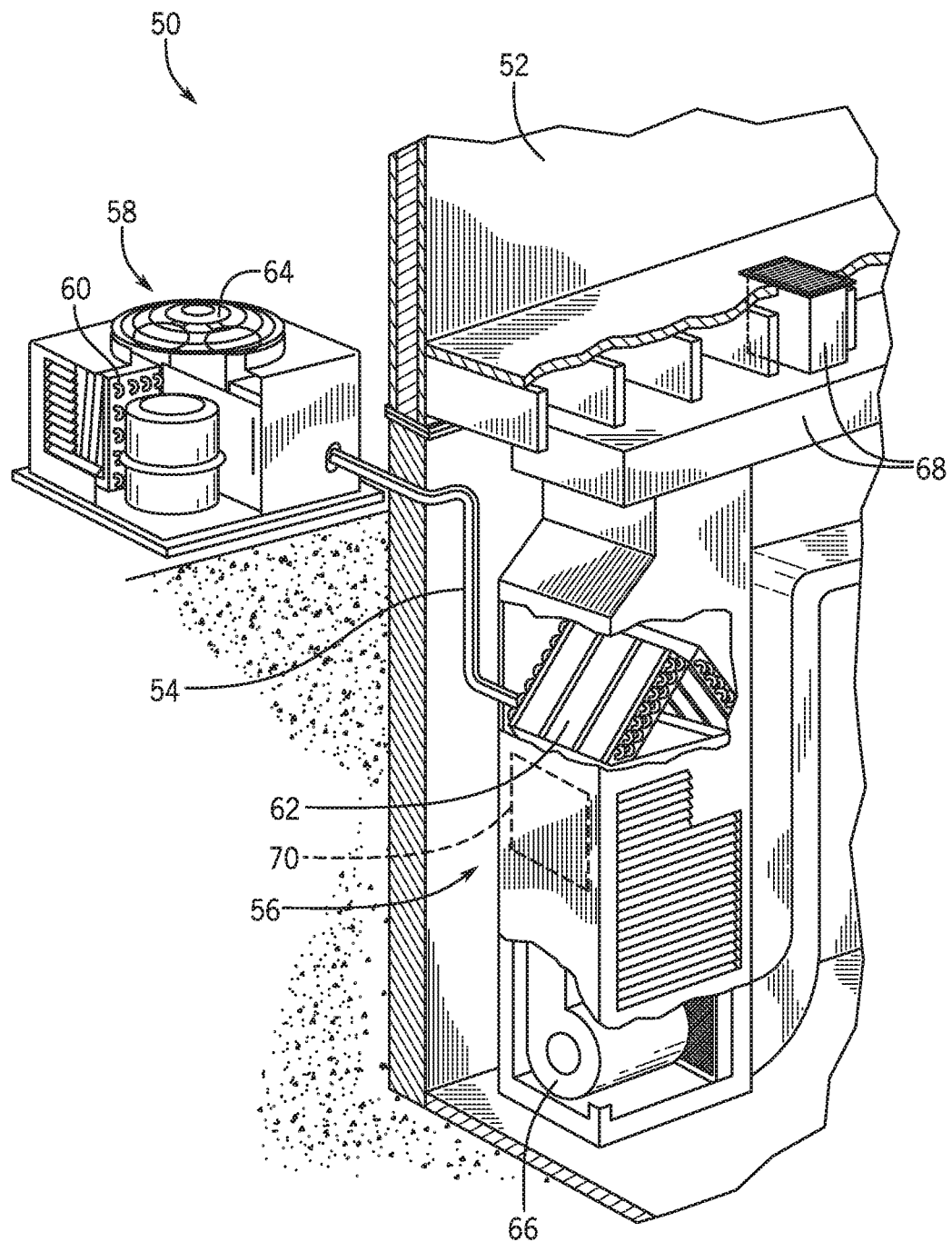
FIG. 3 is a perspective view of a residential heating and cooling system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
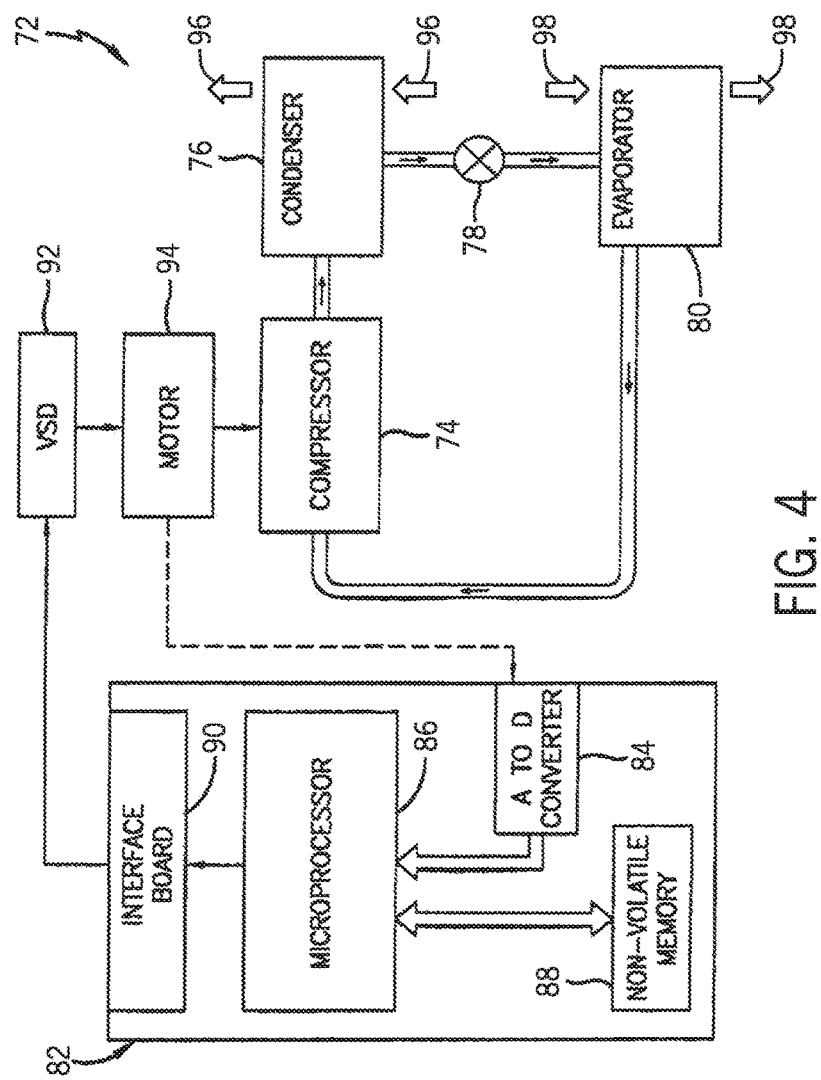
FIG. 4 is a schematic diagram of a vapor compression system that may be used in the HVAC system of FIG. 1 and the residential heating and cooling system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, the control device 16 may be used to control the temperature of air delivered to a conditioned space, such as the building 10. For example, the control device 16, which also referred to as an HVAC control device, can regulate operation of one or more components of the HVAC unit 12 or other components, such as dampers and fans, within the building 10 that may control flow of air through and/or from the ductwork 14. In other words, HVAC control devices 16 may regulate heating, ventilating, air conditioning, or any combination thereof associated with an HVAC system. Additionally, control devices 16, such as thermostats, may also be included in residential structures to regulate conditioned air that flows into the residential structures. For example, one or more control devices 16 may be included in the residential heating and cooling system 50, and the control devices 16 may regulate the temperature and humidity of air supplied to the residential structure. For instance, the control devices 16 may cause operational settings of the indoor unit 56 and the outdoor unit 58 to change to cause conditioned air delivered by the indoor unit 56 and/or the outdoor unit 58 to be a desired temperature and/or humidity.

As discussed below, control devices 16 may generally regulate characteristics of the air supplied to buildings, such as the building 10 or residential structures, to correspond with certain default settings. For instance, control devices 16 may be programmed to regulate a temperature of air supplied to the buildings in order to maintain the temperature of air within an enclosure to be within a range of temperatures. The present disclosure discusses several override modes that may be implemented in order to deviate from the default settings of the control device 16. Additionally, as described below, the override modes may be generated and/or implemented via execution of an application of a secondary input device that can communicate with the control devices 16. For example, the secondary input device may be a portable device, such as a "smartphone," "tablet," "fitness tracker" or "smartwatch." Smartphones are mobile phones that can perform functions of personal computers, such as access the Internet, write and send emails, and the like. Tablets, which are also known as tablet computers, are mobile computers that include a touchscreen display. Fitness trackers, which are also known as activity trackers, are typically devices worn by a user that can monitor and/or track a various fitness metrics, such as distance run or walked. Smartwatches are computerized wristwatches. Moreover, in some embodiments, default settings may be overridden without user input.

Figure 5:
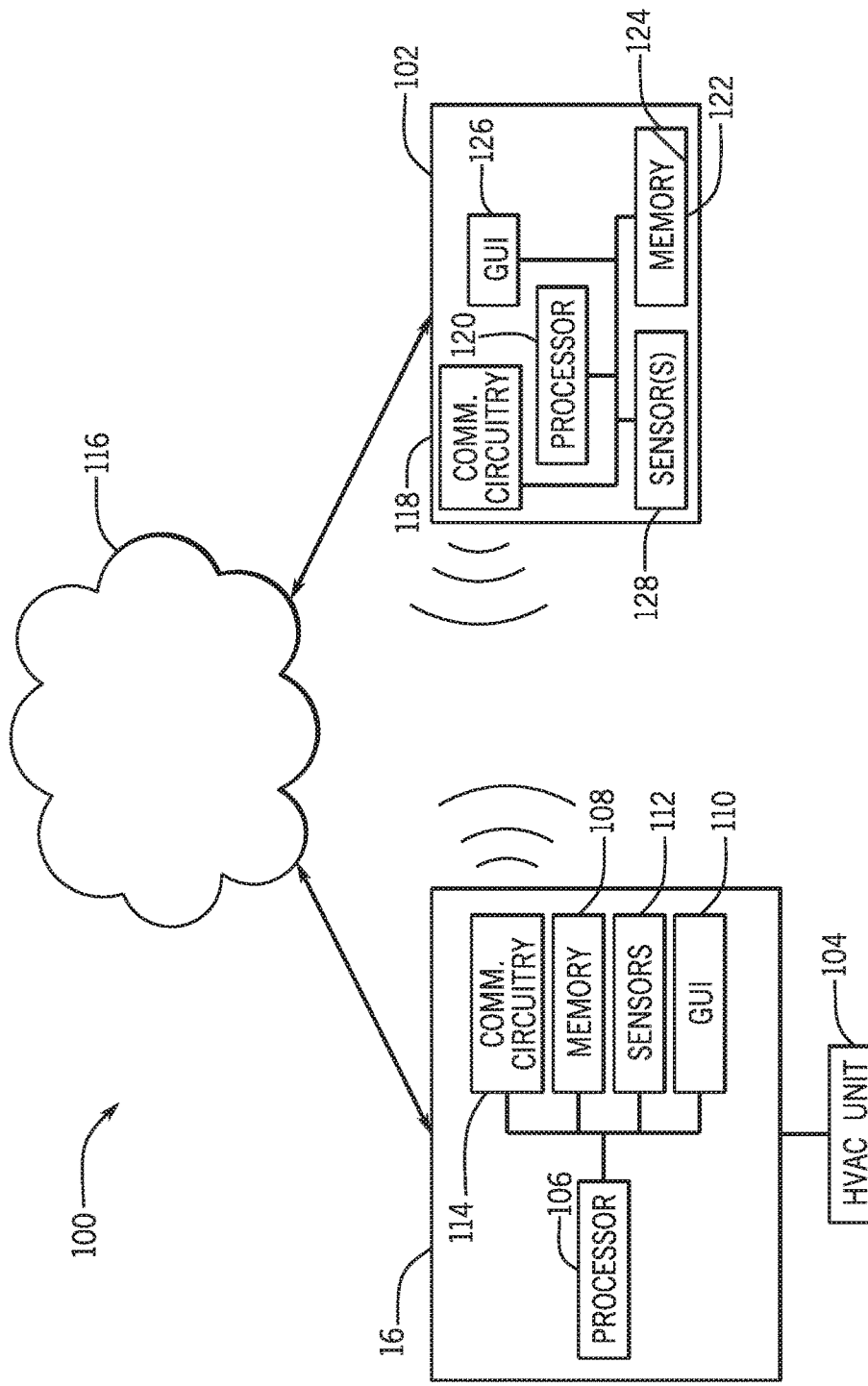
FIG. 5 is a schematic diagram of an HVAC system that can be controlled by a control device and a secondary input device, in accordance with embodiments described herein.

With the foregoing in mind, FIG. 5 is a schematic diagram of an HVAC system 100 that can be controlled by the control device 16 (e.g., a thermostat) and a secondary input device 102. As illustrated, the HVAC system 100 also includes an HVAC unit 104 that can be controlled by the control device 16. As discussed herein, the secondary input device 102 may control the HVAC system 100 and HVAC unit 104 indirectly. More specifically, the secondary input device 102 may communicate with the control device 16, and such communication may cause the control device 16 to perform a control action of the HVAC system 100 and/or the HVAC unit 104. Moreover, before proceeding further into the discussion of FIG. 5, it should be noted that the HVAC system 100 may be analogous to the systems illustrated in FIG. 1 and FIG. 3. In other words, the HVAC system 100 may be used in industrial, commercial, and residential settings, and the HVAC system 100 may also include any of the components of the systems discussed in relation to FIGS. 1-4. For example, the HVAC unit 104 may be the HVAC unit 12 of FIG. 2, and the HVAC system 100 may include the vapor compression system 72 of FIG. 4.

The control device 16 includes a processor 106 that can execute instructions such as software or firmware that are stored in memory 108 that, when executed, enables the control device 16 to manage characteristics of the air delivered to a structure by the HVAC system 100. For instance, the control device 16 may supply air at certain temperatures according to default temperature settings stored on the memory 108. As discussed below, the memory 108 may also include instructions that allow for the control device 16 to implement several types of override modes based on input received from another device, such as secondary input device 102.

The control device 16 also displays information, such as settings associated with the HVAC system 100, and allows for users to modify the settings via a graphical user interface (GUI) 110. For example, the GUI 110 may be a touchscreen. In other embodiments, the GUI 110 may be a display other than a touchscreen. In such embodiments, the control device 16 may include input devices such as buttons, dials, and wheels that users may use to modify settings of the HVAC system 100.

Additionally, the control device 16 includes sensors 112 that are used to collect data. The sensors 112 may include temperature sensors, humidity sensors, pressure sensors, sound sensors, infrared sensors, motion sensors, and/or a variety of other sensors. Data collected by the sensors 112 may be displayed on the GUI 110, and the data may be used by the processor 106 to determine various control actions. For example, if the data collected by the sensors 112 is indicative that the air temperature inside a structure in which the HVAC system 100 supplies conditioned air is at or has fallen outside of a default range of temperature values, the control device 16 may send a command that alters operation of the HVAC unit 104 in order to cause the air temperature within the structure to be within the default range of temperature values. For example, the command may alter operation of the HVAC unit 104 so modify a temperature of air supplied to the structure. As discussed below, override modes to a default mode of the control device 16 may be made based on data collected by the sensors 112 and data collected by the secondary input device 102.

The control device 16 also includes communication circuitry 114 that may enable communication with other devices, such as the secondary input device 102. The communication circuitry 114 may include wired and/or wireless networking interfaces that enable the control device 16 to send and receive data to and from the secondary input device 102. For example, the communication circuitry 114 may include wireless networking interfaces that allow for Bluetooth communication and/or communication according to one or more of the 802.11 protocols set forth by the Institute of Electrical and Electronics Engineers. Communication between the control device 16 and other devices may occur via a router. For instance, a router may host a network 116 and provide access to the network 116 and the Internet to devices communicatively connected to the router. Additionally, in some embodiments, the network 116 may be a cloud network. A server may host the cloud network, and data may be transmitted between the control device 16 and the secondary input device 102 via the cloud network 116. Communication between the control device 16 and the secondary input device 102 may also occur via peer-to-peer communication.

Focusing now on the secondary input device 102, the secondary input device 102 may be one or more of many various types of electronic devices that can communicate with the control device 16. For example, the secondary input device 102 may be a smartphone, tablet, fitness tracker, smartwatch, other portable electronic devices, or other similar devices. As discussed in detail below, the secondary input device 102 may include an application that can be utilized to perform various override modes of default settings of the HVAC system 100. Moreover, the data communicated by the secondary input device 102 to the control device 16 may be utilized in the implementation of an override mode that can occur without direct user input.

Additionally, as discussed above, the secondary input device 102 may communicate with the control device 16. More specifically, the secondary input device 102 includes communication circuitry 118, which allows the secondary input device 102 to communicate with the control device 16. Similar to the communication circuitry 114, the communication circuitry 118 may include wired and/or wireless networking interfaces, and such interfaces enable the secondary input device 102 to communicate with the control device 16. For instance, and as illustrated, the communication circuitry 118 may enable wireless communication via the network 116.

The secondary input device 102 may include a processor 120 that can execute instructions stored on memory 122. The memory 122 may also include an application 124 that can be executed by the processor 120. Upon execution, the application 124 allows for several override modes to be performed to default settings of the control device 16 regarding operations of the HVAC system 100. While discussed in greater detail with respect to FIGS. 6-8 below, it should be noted that the application 124 can be displayed via a GUI 126, and a user may interact with the application 124 via the GUI 126. For example, the GUI 126 may be a touchscreen or include another type of display. In some embodiments, the secondary input device 102 may include various input devices, such as buttons, a keyboard, keypad, switches, knobs, dials, and the like, and the input devices may be used to provide user input to the secondary input device 102. For example, upon receiving user input via the GUI 126 or the input devices, the secondary input device 102 may send signals (e.g., commands) corresponding to the user input that cause the control device 16 to implement an override mode of default setting associated with the HVAC system 100.

The secondary input device 102 may include one or more sensors 128, and data collected by the sensors 128 may be processed by the processor 120 and communicated to the control device 16 via the communication circuitry 118. The sensors 128 may include magnetometers, global positions system (GPS) sensors, accelerometers, barometers, sounds sensors (e.g., a microphone), heart rate monitors, thermometers, air humidity sensors, pedometers, and the like. As discussed below, settings of the control device 16 as well as the HVAC unit 104 may be changed based on data acquired via the sensors 128.

Before continuing to the next drawing, it should be noted that in other embodiments, the secondary input device 102 may include some or all of the components in the illustrated embodiment and that some components may have some or all of the functionalities discussed above. For example, some secondary input devices 102 may include a user interface other than the GUI 126. Moreover, in some embodiments, the communication circuitry 118 may communicate using some or all of the techniques discussed above.

Figure 6:
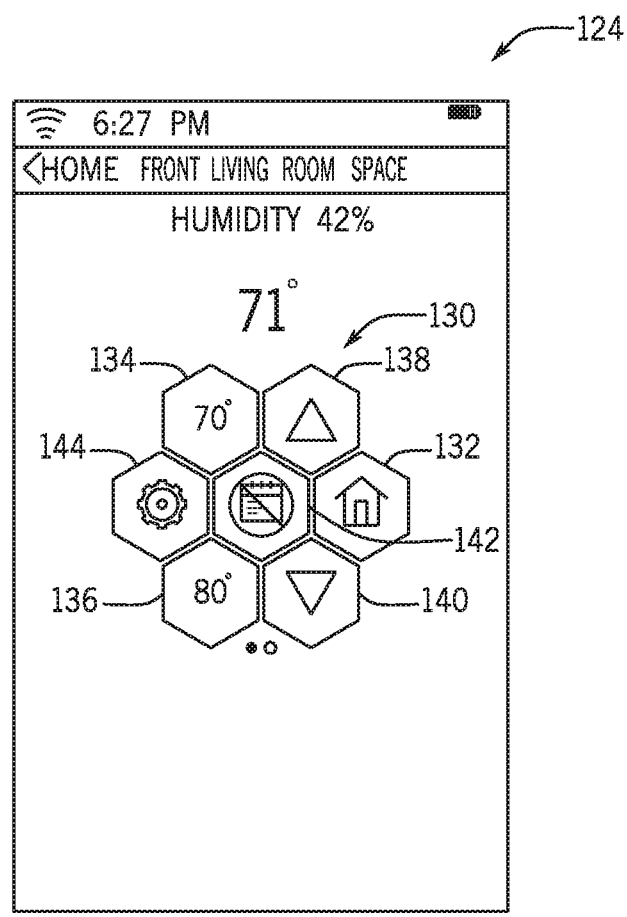
FIG. 6 is an illustration of an application that can be displayed on a graphical user interface (GUI) of the secondary input device of FIG. 5, in accordance with embodiments described herein.

Keeping the discussion of FIG. 5 in mind, FIG. 6 is an illustration of the application 124 being displayed on the GUI 126 of the secondary input device 102. The application 124 may provide various information to users regarding a particular room or space within an enclosure, building, or other structure. For example, and as illustrated, the application 124 may provide a current air temperature and humidity. The data displayed to user may be obtained by the sensors 112. For example, the temperature displayed by the application 124 may be detected by one or more of the sensors 112, communicated to the secondary input device 102 via the communication circuitry 114, and subsequently displayed on the secondary input device 102 via the GUI 126.

The application 124 may also include one or more icons 130 with which a user can interact in order to perform various actions and/or view information. For example, one of the icons 130 is an icon 132 indicating a mode of operation associated with the HVAC system 100. In the illustrated embodiment, the mode of icon 132 corresponds to the default HVAC settings of the HVAC system 100 and control device 16. That is, the illustrated embodiment of the icon 132 corresponds to a default mode of the HVAC system 100. It should be noted that the image within the icon 132 may change, for instance, based on user input. For example, as discussed below, a user may create and/or implement an override mode, and while such override mode is active, an image associated with the override mode will be displayed in the icon 132.

Icon 134 indicates a minimum desired temperature associated with the default mode, and icon 136 indicates a maximum desired temperature associated with the default mode. In other words, the icons 134 and 136 are indicative of temperature set points that are currently in place. When the detected temperature within the room or space falls below the minimum desired temperature, the control device 16 may send a command causing heated air to be delivered by the HVAC unit 104 to the room or space. When the detected temperature exceeds the maximum desired temperature, the control device 16 may send a command causing the HVAC unit 104 to supply cooled air to the room or space.

In the illustrated embodiment, the user may adjust the temperatures indicated by the icon 134 and the icon 136 using icon 138 and icon 140. For example, the user may select (e.g., press) the icon 134 and subsequently select the icon 138 a number of times equal to the amount of degrees the user wishes to raise the temperature indicated by the icon 134. As another example, the user may select the icon 136 and subsequently select the icon 140 a number of times equal to the amount of degrees the user wishes to lower the temperature indicated by the icon 136. The temperatures indicated by the icons 134 and 136 will be adjusted based on the number of times the icons 138 and 140 are selected by the user. In other words, the user may change the default temperature settings in a particular room or space using the icons 138 and 140.

Icon 142 indicates with a no symbol (i.e., a circle with a slash running through the circle) that one or more of temperature set points indicated by the icons 134 and 136 differ from the values associated with the default temperature set points or that an override mode is active. For example, if the icon 132 is indicative of the default mode, the no symbol of the icon 142 may indicate that one or both of the temperature set points indicated by the icons 134 and 136 are different than the default values for these set points. As another example, if an override mode is active, the icon 142 is indicative of the override mode being active. That is, the no symbol of the icon 142 can indicate that the HVAC system 100 is not being operated in accordance with the default mode or default settings. A user may select the icon 142 to resume the default mode and/or default settings. For instance, in embodiments in which the GUI 126 is a touchscreen, the user may press the icon 142. Pressing the icon 142 will cause the secondary input device 102 to send a command to the control device 16, and such a command will cause the control device 16 to instruct the HVAC system 100 to operate according to the default mode and/or default settings. Furthermore, when the HVAC system 100 is running according to the default mode, the no symbol is not included in the image of icon 142.

Settings icon 144 may be used to change settings associated with the application 124. For example, selection of the settings icon 144 may allow the user to create override modes and/or modify settings associated with override modes. The user may select the icon 132 in order to implement an override of the default mode (i.e., the mode indicated by the illustrated embodiment of the icon 132). For example, upon selection of the icon 132, icons representative of the various override mode options may be displayed, and the user may select the icon of one of the override modes. Upon selection of an override mode, the secondary input device 102 communicates the selected override mode to the control device 16. The control device 16 may then adjust operating settings of the HVAC system 100 in accordance with the selected override mode.

Figure 7:
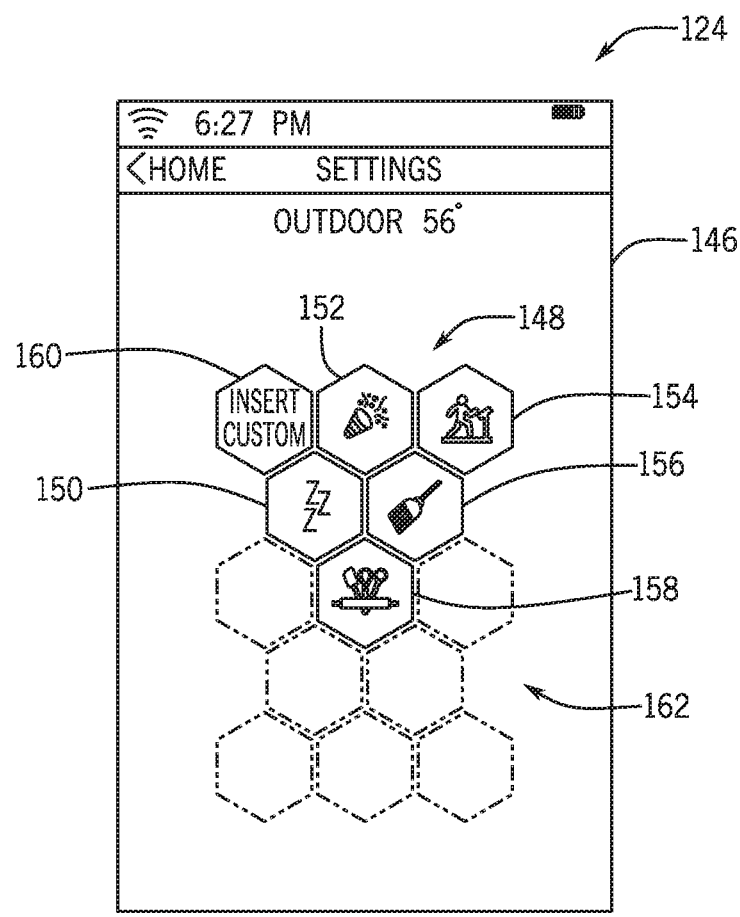
FIG. 7 is an illustration of a settings screen of the application of FIG. 6 that is displayed in response to user input indicative of a selection of the settings icon of FIG. 6, in accordance with embodiments described herein.

FIG. 7 is an illustration of an embodiment of a settings screen 146 of the application 124 that is displayed in response to user selection of the settings icon 144. The settings screen 146 may be displayed via the GUI 126. As illustrated, an outdoor temperature may be displayed on the settings screen 146. The outdoor temperature may be obtained via the Internet based on the location of the structure to which the HVAC system 100 supplies conditioned air.

The settings screen 146 also includes several override mode icons 148. The override mode icons 148 correspond to various override modes that may be used modify operation of the HVAC system 100. Each of the override modes indicated by the override mode icons 148 may be associated with different HVAC system 100 settings, as well as different rooms or areas of the structure that is supplied with conditioned air by the HVAC system 100. For example, a sleep override mode 150 may be associated with one or more bedrooms that receive conditioned air from the HVAC system 100. Implementation of the sleep override mode 150 may cause the HVAC system 100 to be controlled such that conditioned air within temperature set points different from the default mode is supplied in the one or more bedroom. Similarly, implementation of the sleep override mode 150 may cause the HVAC system 100 to be controlled such that a temperature of air within the one or more rooms is maintained between temperature set points different from the temperature set points of the default mode.

As another example, a party override mode 152 may be associated with areas of a structure in which party or other social events may occur. For instance, the party override mode 152 may cause certain heating and cooling settings to be implemented in areas of a structure or building such as living rooms, dens, family rooms, dining rooms, kitchens, eating areas, and the like. Moreover, the party override mode 152 may cause fans associated with the HVAC unit 104 to circulate and/or provide conditioned air (e.g., cooled air) at a rate that is greater than the a corresponding rate associated with the default mode.

Other override modes may also cause cooled air to be delivered to particular areas of the structure that is supplied with conditioned air by the HVAC system 100. For example, a workout override mode 154, when activated, may cause cooled air to be delivered at a rate faster than the default rate to a particular room in the structure. Similarly, a cleaning override mode 156 may also cool air to be delivered to a room where cleaning is occurring. For example, in the application 124, the user may select the room where the user is located, select the cleaning override mode 156, and the cleaning override mode 156 will be implemented specifically for that room. That is, the HVAC system 100 will regulate environmental settings, such as temperature and humidity, for the rest of the structure (e.g., house) according to the default mode while the environmental settings for one room in particular will be regulated in accordance with the cleaning override mode 156. It should be noted that this functionality is not specific to just the cleaning override mode 156. That is, any override mode, including those discussed below, may be implemented for a specific room while the default mode is maintained in other rooms. Additionally, different override modes may be active in different rooms simultaneously. For example, a cooking override mode 158 may be active in a kitchen, and at the same time, the sleep override mode 150 may be active in one or more bedrooms. Generally speaking, the cooking override mode 158 also causes cooled air to be delivered to a specific room of the house, such as the kitchen. The cooking override mode 158 may also cause fans of the HVAC unit 104 to operate differently (e.g., circulate more air throughout the kitchen).

While a user may select an override mode via the application 124, it should be noted that override modes may be enabled based on data received by the sensors 128 of the secondary input device 102 alone, data received by the sensors 112 of the control device 16 alone, or a combination of data collected via the sensors 112 and 128. In other words, override modes may be activated not only based on user input, but also based on data collected via the sensors 112 and 128. Examples of how override modes may be activated based on sensor data will now be discussed for each of the override modes discussed above.

In one example, the sleep override mode 150 may be implemented based on data collected by the sensors 112 and 128. For example, the sensors 128 may detect a heart rate, and the detected heart rate may be indicative of sleep. For example, the detected heart rate may be significantly lower than an average or normal heart rate of the user. Additionally, the user's location may be determined based on data from the sensors 112. As one example, motion sensors and/or infrared sensors may be utilized to determine that the user is present in a particular room, such as a bedroom. For instance, a motion sensor may collect data indicative of the user entering or being present in the bedroom, and infrared sensors may be used to determine that the user is present in the bedroom based on detected body heat. Such data may be used along with the data from the secondary input device 102, and the processor 106 may determine that the user is asleep and activate the sleep override mode 150 in response to determining that the user is asleep. For example, a threshold pertaining to a likelihood that the user is asleep may be in place, and when the threshold is exceeded, the sleep override mode 150 may be activated by the control device 16. More specifically, a likelihood that the user is asleep may be determined based on heart rate data, data collected by motion sensors, infrared sensors, or a combination thereof. For instance, the likelihood may be determined based on a duration of time for which no motion or a reduced amount of motion is detected (which may be determined based data from motion sensors and/or infrared sensors) and heart rate data such as a current heart rate and a duration of time that the user has had a heart rate associated with sleep. When the likelihood is greater than a threshold, the control device 16 may implement the sleep override mode 150. Additionally, the time of day, which may be stored on the control device 16 and/or acquired via the Internet, may be taken into account in the determination of whether the user is asleep.

The party override mode 152 may also be implemented based on data collected by the sensors 112 and 128. For example, the sensors 112 may include temperature sensors, and the temperature sensors may detect an increase in room temperature attributable to the presence of several people. For example, the control device 16 may determine temperature increase or a rate temperature increase in a room, determine whether the temperature increase or rate of temperature increase corresponds to the presence of several people, and implement the party override mode 152 in order to cool the area of the structure where the people are located.

As another example, the sensors 112 may include infrared sensors, and the control device 16 may determine that the data from the infrared sensors is indicative of the presence of several people. For example, the data collected by the infrared sensor may indicate several points sources of heat in the form of infrared radiation, and the control device 16 may implement the party override mode in response. In addition to temperature data, the party override mode 152 may be implemented based a combination of temperature and location data. Location data may be obtained via motion sensors and infrared sensors, among others. The location data may be indicative of the location of one or more people within the structure. The party override mode 152 may be implemented based on the location data in conjunction with the temperature data. For example, the location data may be indicative of the number of people present, as well as the room or rooms of the structure the people are located within. The control device 16 may utilize this data along with the temperature data in order to determine that a party is taking place, and the control device 16 may implement the party override mode 152 in response to making such a determination.

The workout override mode 154, cleaning override mode 156, and cooking override mode 158 may function similarly to the party override mode 152. That is, sensors 112 may be utilized in a manner similar to the manner described above in relation to the party override mode 152 in order to collect data that may be used to implement the workout override mode 154, cleaning override mode 156, and/or the cooking override mode 158. For example, temperature sensors and/or motion sensors may be included in the sensors 112, and the sensors 112 may collect data that is used by the processor 106 to determine whether one or more of the workout override mode 154, cleaning override mode 156, and cooking override mode 158 should be implemented. For instance, the control device 16 may determine that an increase in temperature in a room as well as motion detected in the room are indicative of a person exercising or cleaning, and implement the workout override mode 154 or cleaning override mode 156, respectively. More specifically, the data collected by the sensors 112 may be indicative of increases in air temperature in a certain area of the structure, infrared radiation from the user, and/or repetitive motions, such as sweeping, vacuuming, lifting weights, jogging on a treadmill, other forms of exercise, and the like. A likelihood that the user is working out and a likelihood that the user is cleaning may be determined based such data, and when the likelihoods exceed respective predetermined thresholds, the workout override mode 154 and/or cleaning override mode 156 may be implemented by the control device 16. Furthermore, it should be noted that data from the secondary input device 102 may also be included in determining the likelihoods of whether the user is working out or cleaning. For example, heart rate data may be used in making such determinations. More specifically, a heart rate that is higher than average may be indicative of the user working out or cleaning.

As an example specific to the cooking override mode 158, an increase in temperature may be detected in the kitchen at or around a predetermined time range (e.g., 5:00 PM to 7:00 PM), and the control device 16 may determine that the increase in temperature may be due to cooking. For example, the control device 16 may determine that the sensor data, such as data detected by an infrared sensor, is indicative of heat emanating from a stove or oven. In such a case, the control device 16 may implement the cooking override mode 158, which may cause the HVAC system 100 to supply additional cooled air to the kitchen. Moreover, the control device 16 may determine a likelihood that cooking is occurring and implement the cooking override mode when the likelihood exceeds a predetermined value, such as a threshold. The likelihood may be determined based on the time of day, sensor data from thermometers and infrared sensors that may be included in the sensors 112, sensor data from motion detectors that may also be included in the sensors 112, or from a combination thereof. For instance, the likelihood may be higher at times of the day associated with meals, when data reflects an increase in temperature in a kitchen or from kitchen appliances, when motion data indicates that the user has been in the kitchen for a predetermined duration such as fifteen minutes.

Operation of the HVAC system 100 may also be modified based on data received via the sensors 128 of the secondary input device 102. In other words, an override mode may be implemented based on data collected by the sensors 128. For example, the workout override mode 154 may be implemented based on data collected by the sensors 128. More specifically, heart rate data may be collected by a heart rate sensor of the sensors 128, and location data of the user may be obtained by a GPS sensor of the sensors 128. The location data may be indicative of the user not being present in the structure. For example, the user could be outside of the structure on a jog. The heart rate data and location data may be sent to the control device 16, and the control device may implement an override mode, such as the workout override mode 154, that may cause parts of the structure to be cooled before the user returns to the structure. The control device 16 may determine the extent to which the structure should be cooled based on the heart rate data, and the control device 16 may determine when to start cooling the structure based on the user's distance from the structure, which may be determined based on the location data.

In the foregoing example, and in several other embodiments, it should be noted that there may be more than one secondary input device 102. For example, some secondary input devices 102 may include communication circuitry 112 that may block communication with the control device 16 or not be configured to communicate with the control device 16 when the secondary input device 102 is not connected to the same network as the control device 16. In such cases, a first secondary input device 102 may communicate with a second secondary input device 102, and the second secondary input device 102 may communicate data collected by the first secondary input device 102 to the control device 16. For example, the first secondary input device 102 may be device that is configured to communicative via Bluetooth, the first secondary input device 102 may be connected to the second secondary input device 102 via Bluetooth, and the second secondary input device 102 may communicate the data from the first secondary input device 102 via another form of wireless communication (e.g., communication via a wireless network, such as a mobile network) to the control device 16. In such a case, data may also be collected by the second secondary input device 102 and sent to the control device 16, and the control device 16 may implement an override mode based on the data from either or both the first and second secondary devices 102. For instance, the first secondary input device 102 may collect heart rate data and send the heart rate data to the second secondary input device 102. The second secondary input device 102 may collect location data and send the heart rate data and location data to the control device 16.

In addition to the override modes discussed above, users may create their own custom override mode via a custom override mode icon 160. Upon selecting the custom override mode icon 160, users may be prompted to enter information regarding the custom override mode to be created. For instance, users may enter a name, select an image to appear on an icon for the custom override mode (e.g., from a library of images stored on the memory 122), select temperature set points for the custom override mode, select a duration of the custom override mode, select desired air humidity set points, select fan speeds, and the like. Custom override modes, once generated, may occupy the space of one of the available spaces 162. Additionally, the control device 16 may be updated such that the control device 16 is enabled to execute the custom override mode. For example, once a custom override mode is generated, data regarding the custom override mode may be sent to the control device 16 via the communication circuitry 118, and such data may enable the control device to implement the custom override mode. The custom override mode may also then be implemented based on user input entered into the control device 16.

Users may also modify settings associated with already-existing override mode by accessing the screen 146 and selecting one of the override mode icons 148. Similar to newly generated override modes, modifications to preexisting override modes may automatically be sent to the control device 16 (e.g., via the communication circuitry 118). That is, the control device 16 may be updated after an override mode is modified via the secondary input device 102.

Figure 8:
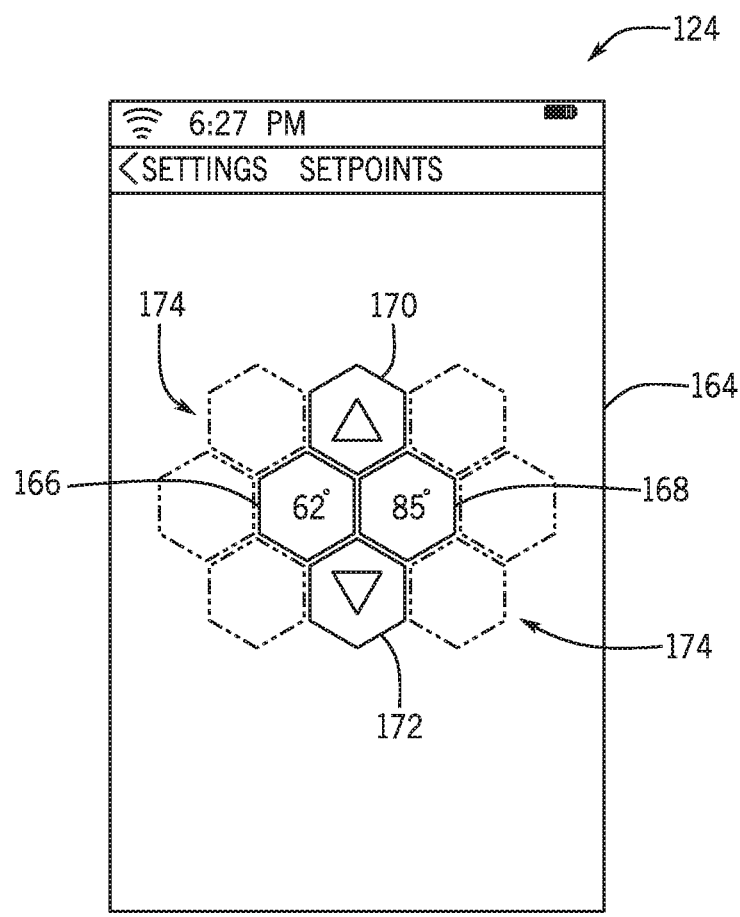
FIG. 8 is an illustration of screen of the application of FIG. 6 that is used to set temperature set points of an override mode, in accordance with embodiments described herein.

FIG. 8 is an illustration of a screen 164 that is displayed on the GUI 126 that allows a user to set temperature set points of a new custom override mode or modify the temperature set points of an existing override mode, such as the sleep override mode 150. As illustrated, the screen 164 includes temperature set points 166 and 168. The temperature set points can be adjusted using the icons 170 and 172. In some embodiments, available icons 174 may be replaced with icons for other settings associated with override modes. For example, the other icons may include icons related to a duration of the override mode (i.e., an amount of time the override mode will last before automatically being deactivated), air humidity set points, fan speeds, and the like.

Additionally, it should be noted that the icons 166 and 168, as well as the icons 134 and 136 of FIG. 6, may be color coded in order to indicate an association of a given icon with a function or characteristic of the HVAC system 100. For example, the icons 134, 136, 166, and 168, which are related to temperature set points, may include number values that are colored in red and blue. In such a case, blue numbers may indicate temperatures above which cooled air will be supplied, and red numbers may indicate temperatures below which warm air will be supplied by the HVAC unit 104.

While several likelihoods have been described above as being used in the determination of whether to implement an override mode based on sensor data, in other embodiments, such determinations may be made using alternative techniques. For example, instead of calculating a likelihood that the user is performing a task associated with an override mode (e.g., sleeping or cooking) and determining whether the likelihood is above a predetermined threshold value, multiple thresholds could also be used. For example, as described above, the sleep override mode 150 may be implemented based on motion sensor data and heart rate data. There may be a threshold associated with each of the motion sensor data and the heart rate data. For example, the threshold associated with the motion sensor data may be a rate of motion that is less than a predetermined value, and the threshold associated with the heart rate data may be a heart rate that is lower than or equal to the user's average heart rate. When one or more of the motion sensor data and heart rate thresholds is met, the control device 16 may implement the sleep override mode 150.

Additionally, the control device 16 may cancel or deactivate an override mode or implement a different override mode based on data obtained from the sensors 112 and 128 or. That is, the control device 16 may switch from implementing an override mode to implementing the default mode or another override mode. For example, a user may have utilized the GUI 126 to make an input that caused the control device 16 to implement an override mode, or the control device 16 may have implemented an override based on sensor data. The control device 16 may determine that current sensor data does not meet another threshold associated with a given override mode. For instance, the sleep override mode 150 may terminated when the likelihood of the user being asleep is less than fifty percent. In other words, while a likelihood of the user performing a certain activity being above a predetermined value may cause the control device 16 to implement an override mode, a likelihood of the user performing an activity that is below the same or a different predetermined value may cause the control device 16 to implement the default mode. As another example, during the implementation of one override mode, the control device 16 may determine that likelihood associated with a different override mode is greater than the likelihood associated with the currently active override mode. In such a case, the control device 16 may implement the different override mode.

Figure 9:
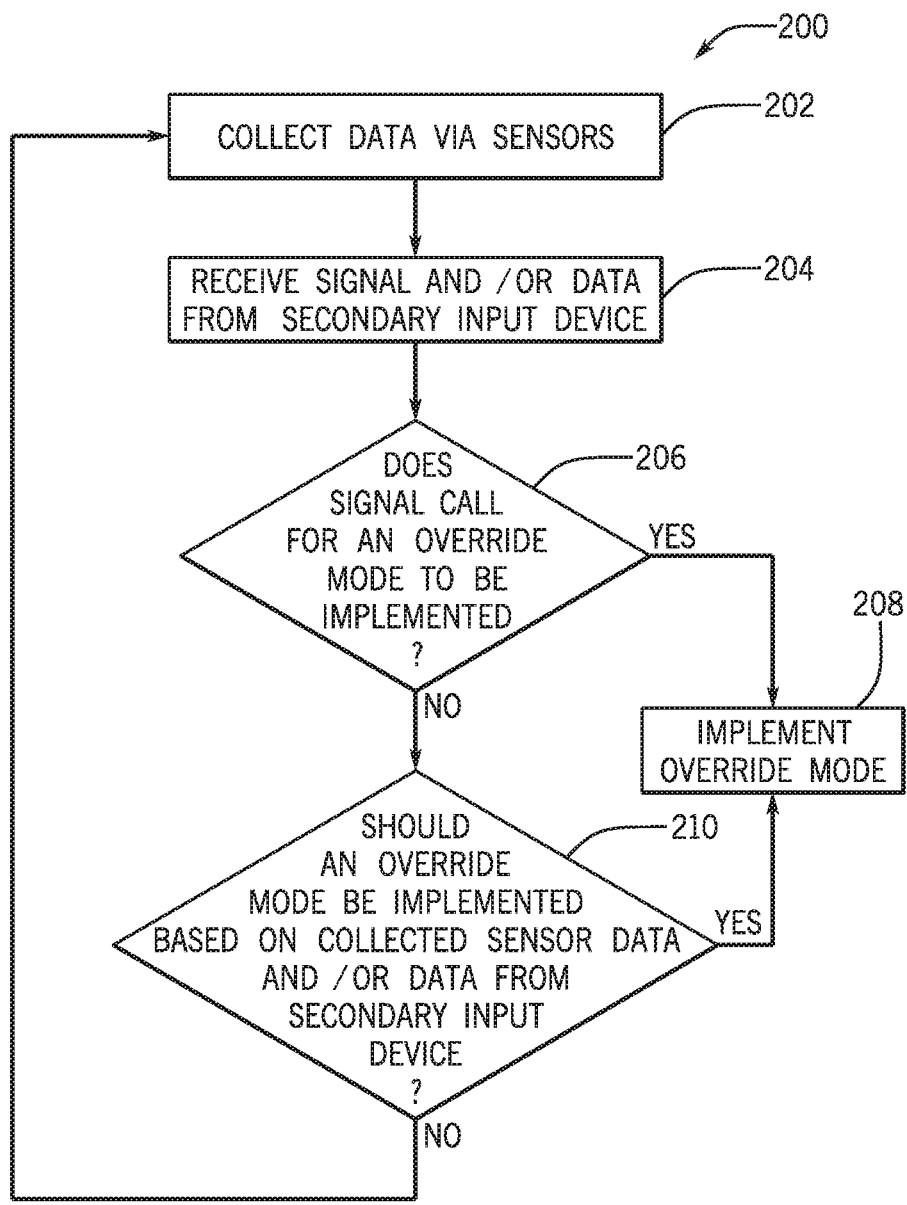
FIG. 9 is a flow chart of a method for implementing override modes, in accordance with embodiments described herein.

Keeping the discussion of FIGS. 5-8 in mind, FIG. 9 is a flowchart of a method 200 for implementing override modes. The method 200 may be executed via the control device 16. Moreover, the steps of the method 200 may be performed in an order that differs from the order described below. Additionally, in some embodiments, one or more of the steps described below may not be performed during execution of the method 200.

At block 202, the control device 16 may collect data via the sensors 112. As described above, the sensors 112 may include various types of sensors, such as temperature sensors, humidity sensors, pressure sensors, sound sensors, infrared sensors, motion sensors.

At block 204, the control device 16 may receive a signal and/or data from a secondary input device 102. For example, user input entered via the GUI 126, such as user input associated with making a request to implement an override mode, may cause the secondary input device 102 to send a signal to the control device 16. As another example, and as discussed above, the secondary input device 102 may include one or more sensors 128, and data collected by the sensors 128 may be communicated to the control device 16 via communication circuitry 118 of the secondary input device 102.

At block 206, the control device 16 may determine whether a signal received by the control device 16 calls for an override mode to be implemented. For example, the control device 16 may determine whether the signal is indicative of the user requesting to implement an override mode. In a case in which the signal is indicative of the user having requested to implement an override mode, at block 208, the control device 16 may implement the override mode.

However, if at block 206 the control device 16 determines that the signal does not call for an override mode to be implemented or that no signal was received, at block 210, the control device may determine whether an override mode should be implemented based on data collected from the sensors 112 and data from the sensors 128 received from the secondary input device 102. For example, as described above, the control device 16 may determine a likelihood that the user is performing a task associated with an override mode, such as sleeping, cooking, cleaning, working out, or hosting a party. The control device 16 may then determine whether the likelihood is above a predetermined value. When the likelihood exceeds the predetermined value, an override mode may be implemented. In other words, when the control device 16 determines that an override mode should be implemented based on the sensor data, at block 208, the control device may implement the override mode.

However, if at block 210 the control device 16 determines that an override mode should not be implemented, at block 202, the control device may resume collecting data via the sensors 112.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the present disclosure, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) control device comprising a processor and a plurality of sensors, wherein the plurality of sensors is configured to collect a first set of data indicative of environmental conditions of a structure, wherein the HVAC control device is located within the structure and is configured to:
control operational settings of an HVAC system that is configured to supply conditioned air to the structure;
operate the HVAC system in a default mode, wherein the default mode comprises default air temperature set points;
receive a second set of data collected by one or more sensors of a secondary input device;
receive a signal from the secondary input device, wherein the signal corresponds to user input received via the secondary input device, wherein the user input is indicative of a user selection of a first override mode of a plurality of override modes;
determine a first likelihood value of a user performing a first task based on the first set of data, the second set of data, and a time of day;
compare the first likelihood value to a threshold value;

implement the first override mode of the HVAC control device in response to the first likelihood value exceeding the threshold value, wherein the first override mode comprises an override temperature set point that differs from the default air temperature set points, wherein the first override mode comprises a user-created override mode, and wherein implementation of the first override mode effectuates a change in the operational settings of the HVAC system;

determine a second likelihood value of the user performing a second task based on the first set of data, the second set of data, or both, and based on the time of day; and implement a second override mode in response to the second likelihood value exceeding the first likelihood value.

2. The HVAC control device of claim 1, wherein the second set of data comprises heart rate data or location data of the user.

3. The HVAC control device of claim 1, wherein the HVAC control device is configured to implement the second override mode such that the first override mode and the second override mode are active at the same time.

4. The HVAC control device of claim 1, wherein the secondary input device comprises a fitness tracker or a smartwatch.

5. The HVAC control device of claim 1, wherein the default mode comprises a default air flow rate provided by one or more fans to one or more areas of the structure, and wherein the first override mode comprises an override air flow rate different than the default air flow rate.

6. The HVAC control device of claim 1, wherein the first set of data comprises data indicative of the user's location within the structure, and wherein the second set of data comprises heart rate data of the user.

7. The HVAC control device of claim 6, wherein the data indicative of the user's location within the structure is collected via an infrared sensor.

8. The HVAC control device of claim 1, wherein the HVAC control device is configured to receive a second user input via a graphical user interface of the HVAC control device, and wherein the second user input is indicative of a request to implement the first override mode.

9. The HVAC control device of claim 1, wherein the user input comprises a single pressing of an icon displayed on a graphical user interface of the secondary input device.

10. The HVAC control device of claim 1, wherein the first override mode is created by the user via an application executed on the secondary input device.

11. The HVAC control device of claim 1, wherein the user-created override mode comprises user selections of one or more temperature set points, a duration of the user-created override mode, one or more air humidity set points, one or more fan speeds, or a combination thereof.

12. The HVAC control device of claim 1, wherein the first task, the second task, or both, comprises cleaning, cooking, working out, sleeping, hosting a party, or a combination thereof.

13. The HVAC control device of claim 1, wherein the first task is sleeping, the first set of data comprises data indicative of motion within the structure, and the second set of data comprises heart rate data of the user.

14. The HVAC control device of claim 1, wherein the first task is cooking, the first set of data comprises data indicative of motion within a kitchen of the structure, and the second set of data comprises temperature data of the kitchen.

15. The HVAC control device of claim 1, wherein the HVAC control device is configured to implement the default mode in response to the first likelihood value being less than the threshold value.

16. A heating, ventilating, and air conditioning (HVAC) system, comprising:

an HVAC unit configured to supply conditioned air to a structure; and an HVAC control device comprising a processor and a first plurality of sensors, wherein the first plurality of sensors is configured to collect a first set of data indicative of a condition of the structure, wherein the HVAC control device is configured to:

control operational settings of the HVAC system;

maintain operation of the HVAC system in a default mode, wherein the default mode comprises default air temperature set points;

receive a second set of data collected by a first sensor of a secondary input device;

receive a signal from the secondary input device, wherein the signal is indicative of a user selection of a first override mode of a plurality of override modes;

determine a first likelihood value of a user performing a first task based on the first set of data, the second set of data, and a time of day;

implement the first override mode in response to the first likelihood value exceeding a threshold value, wherein the first override mode comprises at least one override temperature set point that differs from the default air temperature set points, and wherein implementation of the first override mode effectuates a change in the operational settings of the HVAC system;

determine a second likelihood value of the user performing a second task based on the first set of data, the second set of data, or both, and based on the time of day; and implement a second override mode in response to the second likelihood value exceeding the first likelihood value.

17. The HVAC system of claim 16, wherein the first set of data comprises temperature data associated with the structure.

18. The HVAC system of claim 16, wherein the secondary input device is a first secondary input device, wherein a second secondary input device is configured to collect a third set of data via a second sensor of the second secondary input device, and wherein the HVAC control device is configured to determine the first likelihood value based on the third set of data in addition to the time of day, the first set of data, and the second set of data.

19. The HVAC system of claim 18, wherein the third set of data is communicated to the HVAC control device via the first secondary input device.

20. The HVAC system of claim 18, wherein the second set of data comprises location data of the user, and wherein the third set of data comprises heart rate data of the user.

21. A non-transitory, computer-readable medium comprising instructions configured to cause a processor to:

control operational settings of an HVAC system that is configured to supply conditioned air to a structure;

maintain operation of the HVAC system in a default mode, wherein the default mode comprises default air temperature set points;

receive, via a first sensor, a first set of data related to environmental conditions of the structure;

receive a second set of data collected by a second sensor of a secondary input device;

receive a signal from the secondary input device, wherein the signal is indicative of a user selection of a first override mode of a plurality of override modes;

determine a first likelihood value of a user performing a first task based on the first set of data, the second set of data, or both, and based on a time of day;

compare the first likelihood value to a threshold value;

implement the first override mode in response to the first likelihood value exceeding the threshold value, wherein the first override mode comprises an override temperature set point that differs from the default air temperature set points, wherein the first override mode comprises a user-created override mode, and wherein implementation of the first override mode effectuates a change in the operational settings of the HVAC system;

deactivate the first override mode based on the first set of data, the second set of data, or a combination thereof;

determine a second likelihood value of the user performing a second task based on the first set of data, the second set of data, or both, and based on the time of day; and implement a second override mode in response to the second likelihood value exceeding the first likelihood value.

22. The non-transitory, computer-readable medium of claim 21, wherein the first override mode comprises at least two of: a duration of time setting for the first override mode, an air humidity set point, and a fan speed setting.

23. The non-transitory, computer-readable medium of claim 21, wherein the signal corresponds to user input entered via the secondary input device.

24. The non-transitory, computer-readable medium of claim 21, wherein the first override mode is configured to be implemented within only a portion of the structure.

25. The non-transitory, computer-readable medium of claim 24, wherein:

the first override mode is configured to be implemented within a first room of the structure, wherein the first override mode is different than the second override mode; and the instructions are configured to cause the processor to implement the second override mode in a second room of the structure that differs from the first room of the structure such that the first override mode and the second override mode are active at the same time.

* * * * *